United States Patent [19]

Chinomi

[11] Patent Number: 5,501,422
[45] Date of Patent: Mar. 26, 1996

[54] VEHICULAR SEAT ADJUSTER

[75] Inventor: Isamu Chinomi, Ayase, Japan

[73] Assignee: Ikeda Bussan Co., Ltd., Ayase, Japan

[21] Appl. No.: 217,848

[22] Filed: Mar. 25, 1994

[30] Foreign Application Priority Data

Mar. 29, 1993 [JP] Japan ................................. 5-069686

[51] Int. Cl.$^6$ ....................................................... B60N 2/00
[52] U.S. Cl. ................................... 248/419; 248/421
[58] Field of Search ............................. 248/394, 398,
248/157, 419, 421, 429; 297/325, 329,
330, 344.12, 344.13, 344.15, 344.17

[56] References Cited

U.S. PATENT DOCUMENTS

| | | | |
|---|---|---|---|
| 2,149,945 | 3/1939 | Whedon et al. | 248/419 |
| 2,865,428 | 12/1958 | Williams | 248/419 |
| 2,907,371 | 10/1959 | Scott | 248/419 |
| 4,222,543 | 9/1980 | Gedig et al. | 248/421 X |
| 4,802,374 | 2/1989 | Hamelin et al. | 248/429 X |
| 4,834,333 | 5/1989 | Saito et al. | 248/421 |
| 5,112,018 | 5/1992 | Wahls | 248/394 |
| 5,125,611 | 6/1992 | Cox | 248/429 |

*Primary Examiner*—Alvin C. Chin-Shue
*Assistant Examiner*—Derek J. Berger
*Attorney, Agent, or Firm*—Foley & Lardner

[57] ABSTRACT

A seat adjuster for a vehicular seat is provided with a seat lifting mechanism which includes a front lifting unit, a rear lifting unit and a lifting drive unit. The three units of the seat lifting mechanism are independently connected to a seat rail of a seat slide mechanism. The front and rear lifting units are connected to front and rear portions of the seat, respectively, and move them downward and upward. The lifting drive unit is disposed between the front and rear lifting units. Various parts of the front side of the seat lifting mechanism are formed exactly the same as those of the rear side. Therefore, this seat adjuster realizes reduction in weight and manufacturing cost.

8 Claims, 5 Drawing Sheets

VEHICULAR SEAT ADJUSTER

BACKGROUND OF THE INVENTION

1. Field of the Invention

The present invention relates to improvements in a seat adjuster which comprises a seat slide mechanism and a seat lifting mechanism.

2. Description of the Prior Art

A variety of seat adjusters have been proposed and in practical use. FIGS. 4 and 5 show a typical seat adjuster which has a pair of lower base members 2 fixed to a seat side rail 1 and a pair of upper base members 4 fixed to a seat cushion fame 3. Front and rear shaft members 5 and 5a are laterally disposed at front and rear ends of the lower base members 2, respectively. Front and rear supporting links 6 and 6a are connected with the shaft members 5 and 5a, respectively. Two output shafts 7a of a drive unit 7 is connected with the shaft members 5 and 5a through transmission links 8 and 8a, respectively. The supporting links 6, 6a and the transmission links 8, 8a are formed in different shapes between the front and rear parts.

FIGS. 6 and 7 show another conventional seat adjuster. In this seat adjuster, a pair of base members 2 are fixed on a pair of seat side rails 1. Front and rear shaft members 5 and 5a are laterally disposed at front and rear ends of the base members 2, respectively. Each one end of each relay link 9, 9a is connected to each output shaft 7a of a drive unit 7 and swingably supported to each of the front and rear shaft members 5, 5a. Each supporting link 9b, through which the seat adjuster is fixed to a seat cushion frame 3, is supported to the other swinging end of each relay link 9, 9a. Similarly, in this seat adjuster, the relay links 9 and 9a are formed in different shapes, respectively.

Thus, the conventional seat adjusters are generally formed by using various link members which are formed in different shapes between the front side and the rear side, as shown in FIGS. 4 to 7. Furthermore, these seat adjusters are constructed such that various links of the adjuster are integrally interconnected with the base member to form a lifter unit and that the base member of the lifter unit is fixed to the seat rail and/or the seat cushion frame. Accordingly, this prevents the seat adjuster from being formed smaller and lighter. Accordingly, the manufacturing cost of these seat adjusters becomes high.

SUMMARY OF THE INVENTION

It is an object of the present invention to provide an improved a vehicular seat adjuster which realizes the reduction in the number of the parts and the reduction in the weight.

A seat adjuster according to the present invention is for a vehicular seat and comprises a rail unit for adjustably sliding the vehicular seat in the fore-and-aft direction. The rail unit includes a floor rail which is fixed on a floor of a vehicle body, and a seat rail which is engaged with the floor rail so as to be slidable in the fore-and-aft direction of the vehicle. A seat lifting mechanism is fixed on the seat rail. The seat lifting mechanism includes a lift drive unit which is operated according to a request of a seat occupant, a front lift section which is disposed under a front portion of the seat so as to vertically move the seat front portion according to the operation of the lifting drive unit and a rear lift unit which is disposed under a rear portion of the seat so as to vertically move the seat rear portion according to the operation of the lifting drive unit. The front lifting unit includes a front shaft which is laterally located under the seat front portion and is axially rotated according to the operation of the lifting drive unit, a front supporting link which vertically swings according to the rotation of the front shaft and a front transmission link which connects the lifting drive unit and the front shaft. A rear lifting unit is disposed under a rear portion of the seat so as to vertically move the seat rear portion according to the operation of the lifting drive unit. The rear lifting unit includes a rear shaft, a rear supporting link and the rear transmission link, all of which are the same in shape as the front shaft, the front supporting link and the front transmission link, respectively. The rear shaft is laterally located under the seat rear portion and axially rotated according to the operation of the lifting drive unit. The rear supporting link vertically swings according to the rotation of the rear shaft. The rear transmission link connects the lifting drive unit and the rear shaft.

DETAILED DESCRIPTION OF THE INVENTION

Figure 1:
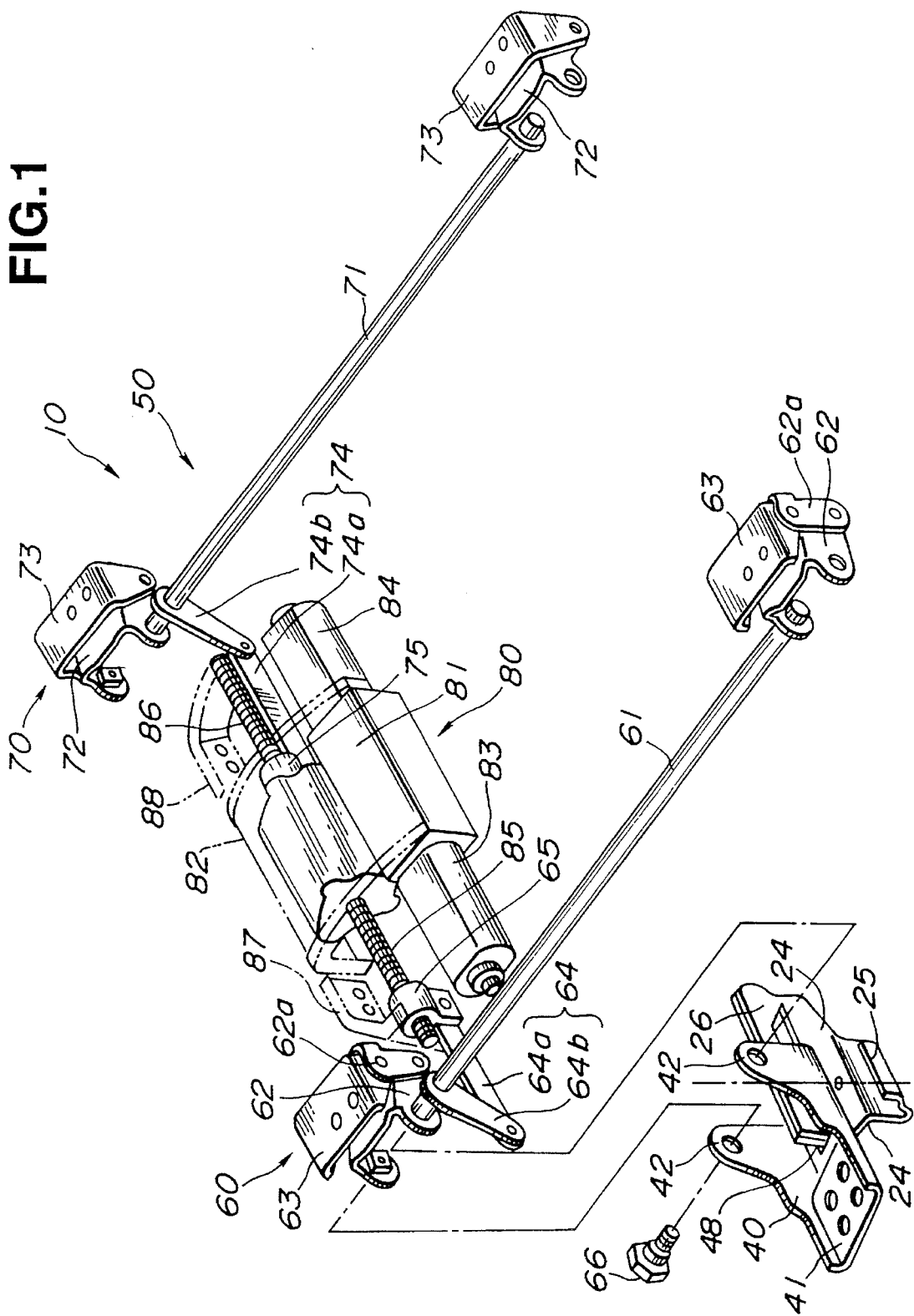
FIG. 1 is an exploded perspective view which shows a lifting mechanism of a first embodiment of a seat adjuster according to the present/invention.
Figure 2:
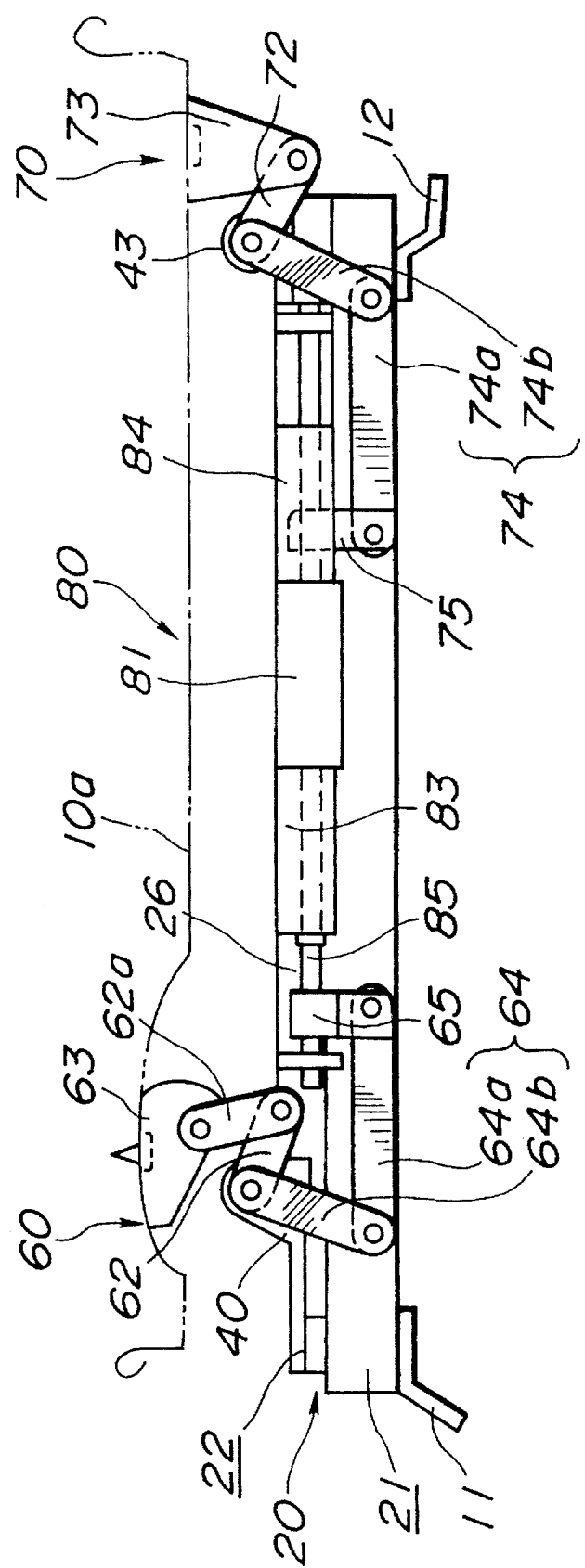
FIG. 2 is a side view of the seat adjuster of FIG. 1.
Figure 3:
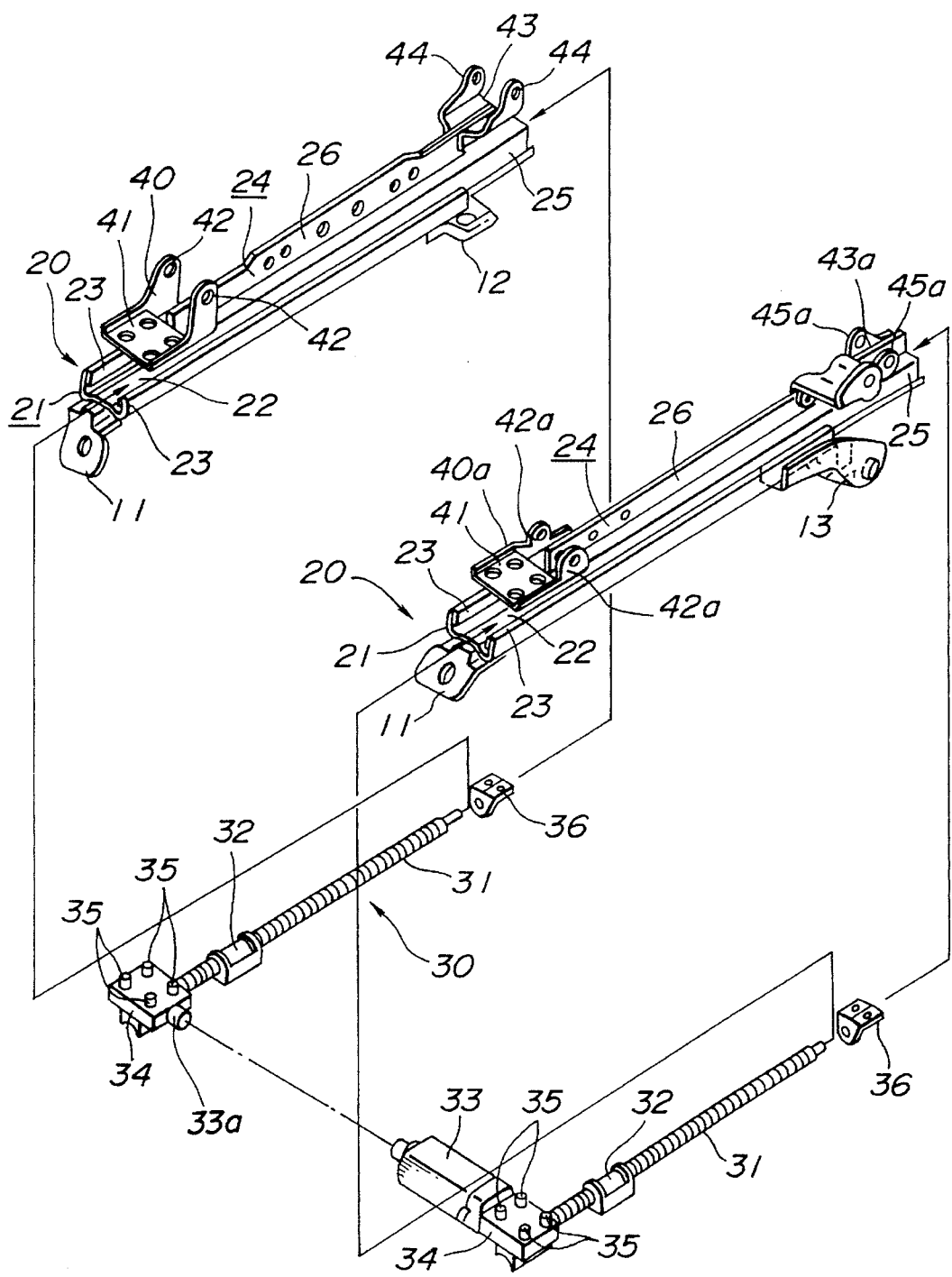
FIG. 3 is an exploded perspective view of a rail unit of the first embodiment of the seat adjuster according to the present invention.
Figure 4:
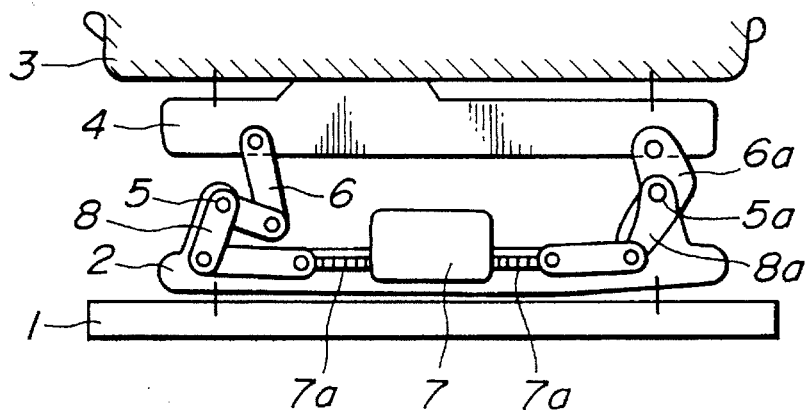
FIG. 4 is a side view of a conventional seat adjuster.
Figure 5:
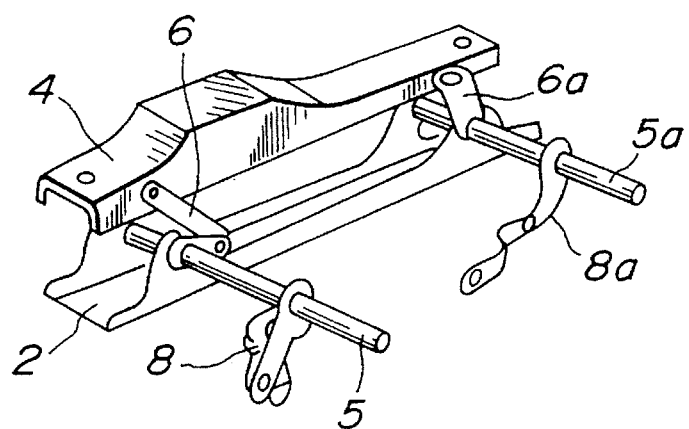
FIG. 5 is a perspective view of FIG. 4.
Figure 6:
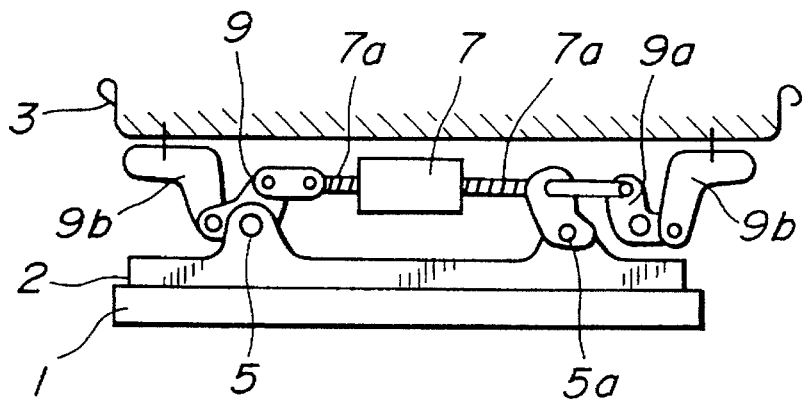
FIG. 6 is a side view of another conventional seat adjuster.
Figure 7:
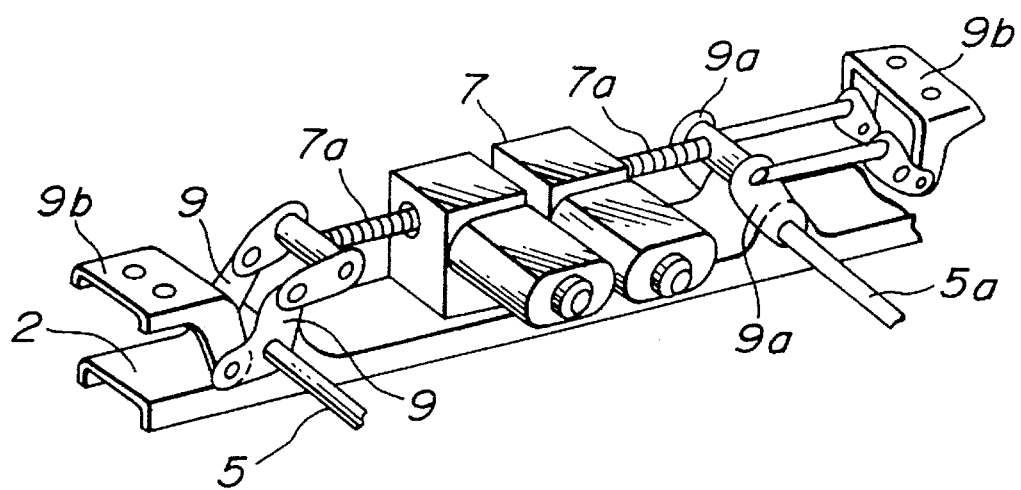
FIG. 7 is a perspective view of FIG. 6.

Referring now to FIGS. 1 to 3, there is shown an embodiment of a vehicular seat adjuster 10 according to the present invention.

As shown in FIGS. 1 to 3, the seat adjuster 10 comprises a pair of rail units 20 which are disposed parallel under the respective lateral sides of a seat 100 and a seat lifting mechanism which is disposed between the rail units 20 and the seat 100 and supports the seat 100 so as to be vertically movable relative to the rail units 20.

As shown in FIG. 3, each rail unit 20 comprises a floor rail 21 which is fixed on a vehicle floor through leg members 11 and 12 (or 13), and a seat rail 24 which is slidably engaged with the floor rail 21 and supports the seat 100. The floor rail 21 has a bottom portion 22 and a pair of side wall portions 23, and forms a channel in cross-section. The seat rail 24 comprises a sliding portion 25 slidably engaged with the floor rail 21 and a perpendicular plate portion 26.

The rail units 20 comprise a rail drive unit 30 for sliding the seat rail 24 relative to the floor rail 21 in the fore-and-aft direction of the vehicle. The rail drive unit 30 comprises a pair of screw members 31 which are disposed in the spaces between floor rails 21 and each seat rails 24, respectively, in the fore-and-aft direction. A pair of nut members 32 are rotatably screwed on the screw members 31, respectively. A pair of gear boxes 34 are connected to the screw members 31, respectively. The gear box 34 functions to change a rotational speed to be applied to the screw member 31 from an electric motor 33. The front end of the screw member 31 is rotatably supported by the gear box 34. The gear box 34 is fixed to the perpendicular plate portion 26 of the seat rail 24 through an installation member 40 (40a). The installation member 40 (40a) has a center slit 48 and is formed in a generally U-shaped cross-section which is upwardly opened. The installation member 40 (40a) is engaged with the perpendicular plate portion 26 through the center slit 48. The installation member 40 (40a) is fixedly connected so as to be symmetrical its left and right sides relative to the fore-and-aft directional axis of the perpendicular plate portion 26. Four projections 35 are fixedly connected on the gear box 34 and function to fix the gear box 34 to the installation member 40 of the seat rail 24. The electric motor 33 is integrally connected to a side wall of one of the gear boxes 34 and connected to the other gear box 34 through a direct driving shaft 33a. On the other hand, a rear end of the screw member 31 is supported by an inner portion of the sliding portion 25 through each supporting bracket 36. The nut member 32 is fixed with the bottom portion 22 of the floor rail 21 so as not to be movable in the fore-and-aft direction and not to be rotated with the screw member 31. The rail drive unit 30 is operated by a seat occupant so as to adjust the seat 100 in the fore-and-aft direction.

As shown in FIG. 1, the seat lifting mechanism 50 comprises a front lifting unit 60 which is disposed under a front side of the seat 100 to vertically adjust the front portion of the seat 100. A rear lifting unit 70 is disposed under a rear side of the seat 100 to vertically adjust the rear portion of the seat 100. A lifting drive unit 80 is disposed between the front lifting unit 60 and the rear lifting unit 70. The lifting drive unit 80 functions to vertically move the front and rear lifting units 60 and 70.

The front lifting unit 60 comprises a front shaft member 61 which is laterally disposed between the perpendicular plate portions 26 of the respective seat rails 24. A pair of supporting links 62 are fixed at both end portions of the front shaft member 61, respectively, so as to swing upward or downward according to the rotational direction of the front shaft member 61. A transmission link 64 interconnects the front shaft member and the lifting drive unit 10 and functions to transmit the motive power of the lifting drive unit 80 to the front shaft member 61 in order to rotate the shaft member 61.

As shown in FIGS. 1 and 2, the supporting link 62 has a generally U-shaped cross-section which is downwardly opened. The supporting link 62 is supported on the installation member 40 fixed to the perpendicular plate portion 26 of the seat rail 24 so as to cover a part of the front portion of the perpendicular plate portion 26. That is, the front end portions of the supporting link 62 is connected with two end portions 42 and 42a of the installation members 40 and 40a through a shoulder bolt so as to be vertically swingable. Each installation member 40, 40a has a fixing portion 41 which has four holes and to which the upper surface of the gear box 34 of the rail unit 20 is fixed such that the engaging projections 35 are engaged into the holes of the installation member 40.

The rear end portion of the supporting link 62 is connected with an installation link 63 through a relay link 62a. The installation link 63 is fixed to the bottom of a seat cushion frame 0a. More particularly, the lower end portion of the relay link 62a is supported at the rear end of the supporting link 62 by means of a pin, and the upper end portion of the relay link 62a is supported on the installation link 63 by means of a pin. The installation link 63 is formed in a generally U-shape in cross-section and disposed to cover the rear end portion of the supporting link 62 from the upper side of the supporting link 62 so as to be rotatably supported to the relay link 62a.

Front shaft member 61 is formed in a column. The both ends of the front shaft member 61 are penetratingly fixed with the front end portion of the both supporting links 62 such that the supporting link 62 is rotated with the front shaft member 61. Furthermore, each end of the front shaft member 61 are rotatably connected with each of the end portions 42 and 42a of the installation members 40 and 40a, and the other end portion 42 of the installation member 40 is rotatably connected with the supporting link 62 by means of a shoulder bolt, as shown in FIG. 1. The transmission link 64 for transmitting the motive power of the lifting drive unit 80 to the front shaft member 61 is connected with the front shaft member 61. The transmission link 64 comprises a first transmission link member 64a which is directly driven by the lifting drive unit 80, and a second transmission link member 64b whose one end is rotatably connected with an end of the first transmission link member 64a and whose the other end is fixedly connected with the front shaft member 61. Accordingly, when the lifting drive unit 80 is operated, the front shaft member 61 is rotated through the transmission link 74.

The rear lifting unit 70 comprises a rear shaft member 71 which is laterally disposed between the perpendicular plate portions 26 of the respective seat rails 24. A pair of supporting links 72 are fixed at both end portions of the rear shaft member 71, respectively, so as to vertically swing according to the rotation of the rear shaft member 71. A transmission link 74 interconnects the lifting drive unit 80 and the rear shaft member 71, and functions to transmit the motive power of the lifting drive unit 80 to the rear shaft member 71 in order to rotate the rear shaft member 71. The rear shaft member 71, the supporting link 72 and the transmission link 74 of the rear lifting unit 70 are the same as the corresponding parts of the front lifting unit 60.

As shown in FIGS. 1 and 2, the supporting link 72 has a generally U-shaped cross-section which is downwardly opened. The supporting link 72 is supported to the installation member 43 fixed to the perpendicular plate portion 26 so as to cover a part of the rear portion of the perpendicular plate portion 26. That is, the front end portion of the supporting link 72 is connected with two end portions 44 of the installation member 43 so as to be swingable in the vertical direction. The installation member 43 is made from two generally L-shaped members and these members are fixed at respective side walls of the perpendicular plate portion 26 of the seat side rail 24 so as to be opposite to each other.

The rear end portion of the supporting link 72 is connected with an installation link 73 directly fixed to a bottom portion of the seat cushion frame 10a. More particularly, the installation link 73 is formed in a U-shaped cross-section which is downwardly opened so as to cover the rear end of the supporting link 72 from an upper side. The installation link 73 is rotatably connected with the supporting link 72.

The transmission link 74 is exactly the same as the transmission link 64 of the front lift unit 60. More particularly, the transmission link 74 is constituted by a first transmission link member 74a which receives driving force from the lifting drive unit 80 and a second transmission link member 74b whose one end is rotatably interconnected with an end of the first transmission link member 74a and whose the other end is fixed to the rear shaft member 71. Accordingly, the rear shaft member 71 is rotated by the transmission link 74 when the lift driving section 80 is operated.

As shown in FIGS. 1 and 2, the lifting drive unit 80 has a gear box 81 which is fixed to the inner wall surface of the perpendicular plate portion 26 of the seat side rail 24. Front and rear driving motors 83 and 83 are installed to front and rear end surface of the gear box 81, respectively. The front and rear driving motors 83 and 84 are connected to front and rear driving screws 85 and 86. The rotations of the front and rear driving screws 85 and 86 move front and rear driving nuts 65 and 75 in the fore-and-aft direction.

The lifting drive unit 80 is located between the front and rear lifting units 60 and 70 and transmits motive power to the front and rear shaft members 61 and 71 of the front and rear lift units 60 and 70 through the respective transmission links 64 and 74.

Each of base end portions of the front and rear driving screw shafts 85 and 86 is inserted into and supported by the gear box 81. Each of tip end portions of the front and rear driving screw shafts 85 and 86 is supported to the inner wall surface of the perpendicular plate portion 26 of the seat rail 24 through each shaft support bracket 87, 88.

An end of the first transmission link member 64a is rotatably supported to the front driving nut 65. The other end of the first transmission link member 64a is rotatably connected to the second transmission link member 64b. Similarly, an end of the first transmission link member 74a constituting the transmission link 74 of the rear lifting unit 70 is rotatably supported to the rear driving nut 75. The other end of the first transmission link member 74a is rotatably connected to the second transmission link member 74b.

Accordingly, according to the fore-and-aft movements of the front and rear driving nuts 65 and 75, the supporting links 62 and 72 are moved upward or downward through the shaft members 61 and 71 so as to vertically move the seat 100.

The manner of operation of the thus arranged seat adjuster 10 according to the present invention will be discussed hereinafter.

Referring to FIGS. 2 and 3, the seat cushion frame 10a slides with the seat lifting mechanism 50 in the fore-and-aft direction due to the sliding movement of the seat side rails 24 relative to the floor side rails 21. That is, the screw member 31 is connected to the seat rail 24 so as to be axially rotatable and fixed in the fore-and-aft direction while the nut member 32 is rotatable relative to the screw member 31 and fixed to the floor rail 21. Accordingly, the seat position in the fore-and-aft direction relative to the vehicle floor is properly adjusted when the electric motor is operated according to a request of a seat occupant.

In the seat lifting mechanism 50, the seat 100 is moved upward and downward by the swinging movement of the transmission links 64 and 74 according to the operation of the lifting drive unit 80. More particularly, as shown in FIG. 1, when the front side driving nut 65 is rearwardly moved by the operation of the front side driving motor 83, the rear end of the supporting link 62 is upwardly swung, and therefore the front end portion of the seat cushion frame 10a is moved upward. On the other hand, when the rear side driving nut 75 is rearwardly moved by the operation of the rear side driving motor 84, the rear end of the supporting link 72 is upwardly swung, and therefore the rear end portion of the seat cushion frame 10a is moved upward. It is of course that such operations of the lifting drive unit 80 is implemented according to the request of the seat occupant.

Furthermore, the installation member 40 (40a) is engagedly fixed to the perpendicular plate portion 26 of the seat rail 24. Accordingly, the distance between the seat rail 24 and the seat lifting mechanism 50 is shortened while improving the connecting strength between the perpendicular plate portion 26 of the seat rail 24 and the installation member 40 (40a).

It will be understood that the operations by the front side driving motor 83 or rear side driving motor 84 may be implemented independently or simultaneously. If the operations of the motors 83 and 84 are simultaneously implemented, the seat is vertically slid. If the operations of the motors 83 and 84 are independently implemented, the oblique angle in the fore-and-aft direction of the seat is changed.

The seat lifting mechanism 50 is constituted by three units formed in compact, that is, the front lifting unit 60, the rear lifting unit 70 and the lifting drive unit 80. Furthermore, such units are installed to the perpendicular plate portion 26 of the seat side rail 24 by means of the respective installation members 40, 43, and the fixing bracket 82. Accordingly, it becomes possible to avoid the use of a base member for the installation of seat lifter mechanism. This reduces the volume and weight of the seat adjuster. Furthermore, various parts of the front side of the seat lifting mechanism 50 are formed exactly the same as those of the rear side. Accordingly it becomes possible to reduce the manufacturing cost of the seat adjuster 10.

Although a preferred embodiment of the invention has been illustrated and described in detail, it will be understood that various changes and modifications may be made in the disclosed embodiment without departing from the scope and spirit of the invention as defined in the appended claims.

What is claimed is:

1. A seat adjuster for a vehicular seat, said seat adjuster comprising:
   a rail unit for adjustably sliding the vehicular seat in the fore-and-aft direction including,
      a floor rail adapted to being fixed on a floor of a vehicle body,
      a seat rail being engaged with said floor rail so as to be slidable in the fore-and-aft direction of the vehicle; and
   a seat lifting mechanism fixed on said seat rail, said seat lifting mechanism including,
      a lifting drive unit being operated according to a request of a seat occupant,
      a front lifting unit adapted to being disposed under a front portion of the seat for vertically moving the seat front portion according to the operation of said lifting drive unit, said front lifting unit including,
         a front shaft adapted to being laterally located under the seat front portion and being axially rotated according to the operation of said lifting drive unit,
         a front supporting link vertically swinging according to the rotation of said front shaft,
         a front transmission link connecting said lifting drive unit and said front shaft,
      a rear lifting unit adapted to being disposed under a rear portion of the seat for vertically moving the seat rear portion according to the operation of said lifting drive unit, said rear lifting unit including,
         a rear shaft being of a same shape as said front shaft and adapted to being laterally located under the seat rear portion, said rear shaft being axially rotated according to the operation of said lifting drive unit,
         a rear supporting link being of a same shape as said front supporting link and vertically swinging according to the rotation of said rear shaft, a rear transmission link being of a same shape as said front transmission link and connecting said lifting drive unit and said rear shaft.

2. A seat adjuster as claimed in claim 1, wherein said seat rail has a perpendicular plate portion which extends in the fore-and-aft direction and in a perpendicular direction relative to the floor, said perpendicular plate having front and rear installation members which support said front and rear shafts, respectively.

3. A seat adjuster as claimed in claim 2, wherein said lifting drive unit is fixed to said perpendicular plate portion through a fixing bracket.

4. A seat adjuster as claimed in claim 2, wherein said front and rear lifting unit are fixed to said perpendicular plate portion through the front and rear installation members, respectively.

5. A seat adjuster as claimed in claim 1, wherein said lifting drive unit has a front drive motor and a rear drive motor which are movable independently and simultaneously.

6. A seat adjuster for a vehicular seat, said seat adjuster comprising:
  a rail unit for adjustably sliding the vehicular seat in the fore-and-aft direction including,
    a floor rail adapted to being fixed on a floor of a vehicle body,
    a seat rail being engaged with said floor rail so as to be slidable in the fore-and-aft direction of the vehicle, said seat rail having a vertical-plate portion extending in the fore-and-aft direction thereof, said vertical-plate portion having front and rear installation members which support said front and rear shafts, respectively, the front installation member having a center slit at which the front installation member is fixedly connected to said vertical-plate portion so as to be symmetrical relative to the fore-and-aft directional axis of said vertical-plate portion; and
  a seat lifting mechanism fixed on said seat rail, said seat lifting mechanism including,
    a lifting drive unit being operated according to a request of a seat occupant,
    a front lifting unit adapted to being disposed under a front portion of the seat for vertically moving the seat front portion according to the operation of said lifting drive unit, said front lifting unit including,
      a front shaft adapted to being laterally located under the seat front portion and being axially rotated according to the operation of said lifting drive unit,
      a front supporting link vertically swinging according to the rotation of said front shaft,
      a front transmission link connecting said lifting drive unit and said front shaft,
    a rear lifting unit adapted to being disposed under a rear portion of the seat for vertically moving the seat rear portion according to the operation of said lifting drive unit, said rear lifting unit including,
      a rear shaft being of a same shape as said front shaft and adapted to being laterally located under the seat rear portion, said rear shaft being axially rotated according to the operation of said lifting drive unit.
      a rear supporting link being of a same shape as said front supporting link and vertically swinging according to the rotation of said rear shaft,
      a rear transmission link being of a same shape as said front transmission link and connecting said lifting drive unit and said rear shaft.

7. A seat adjuster for a vehicular seat, said seat adjuster comprising;
  a rail unit for adjustably sliding the vehicular seat in the fore-and-aft direction including,
    a floor rail adapted to being fixed on a floor of a vehicle body,
    a seat rail being engaged with said floor rail so as to be slidable in the fore-and-aft direction of the vehicle, said seat rail having a vertical-plate portion extending in the fore-and-aft direction thereof, said vertical-plate portion having front and rear installation members which support said front and rear shafts, respectively, the rear installation members each being made from two generally L-shaped members which are fixed at respective side walls of said vertical-plate portion so as to be opposite to each other; and
  a seat lifting mechanism fixed on said seat rail, said seat lifting mechanism including,
    a lifting drive unit being operated according to a request of a seat occupant,
    a front lifting unit adapted to being disposed under a front portion of the seat for vertically moving the seat front portion according to the operation of said lifting drive unit, said front lifting unit including,
      a front shaft adapted to being laterally located under the seat front portion and being axially rotated according to the operation of said lifting drive unit,
      a front supporting link vertically swinging according to the rotation of said front shaft,
      a front transmission link connecting said lifting drive unit and said front shaft,
    a rear lifting unit adapted to being disposed under a rear portion of the seat for vertically moving the seat rear portion according to the operation of said lifting drive unit, said rear lifting unit including,
      a rear shaft being of a same shape as said front shaft and adapted to being laterally located under the seat rear portion, said rear shaft being axially rotated according to the operation of said lifting drive unit,
      a rear supporting link being of a same shape as said front supporting link and vertically swinging according to the rotation of said rear shaft,
      a rear transmission link being of a same shape as said front transmission link and connecting said lifting drive unit and said rear shaft.

8. A seat adjuster for a vehicular seat said seat adjuster comprising:
  a rail unit for adjustably sliding the vehicular seat in a fore-and-aft direction including,
    a floor rail adapted to being fixed on a floor of a vehicle body,
    a seat rail being engaged with said floor rail so as to be slidable in the fore-and-aft direction of the vehicle; and
  a seat lifting mechanism including,
    a lifting drive unit fixed on said seat rail and aligned along the fore-and-aft direction of the vehicle, said lifting drive unit being operated according to a request of a seat occupant,
    a front lifting unit adapted to being disposed under a front portion of the seat for vertically moving the seat front portion according to an operation of said lifting drive unit, said front lifting unit including,
      a front shaft adapted to being laterally located under the seat front portion and being axially rotated according to the operation of said lifting drive unit,
a front supporting link vertically swinging according to a rotation of said front shaft,
a front transmission link connecting said lifting drive unit and said front shaft, and
a rear lifting unit adapted to being disposed under a rear portion of the seat for vertically moving the seat rear portion according to the operation of said lifting drive unit, said rear lifting unit including,
a rear shaft adapted to being laterally located under the seat rear portion, said rear shaft being axially rotated according to the operation of said lifting drive unit,
a rear supporting link vertically swinging according to the rotation of said rear shaft, and
a rear transmission link connecting said lifting drive unit and said rear shaft.

* * * * *